Dec. 18, 1951 — F. A. ERICKSON — 2,578,680
STABILIZER FOR ROTARY WING AIRCRAFT
Filed Dec. 5, 1947 — 4 Sheets-Sheet 1
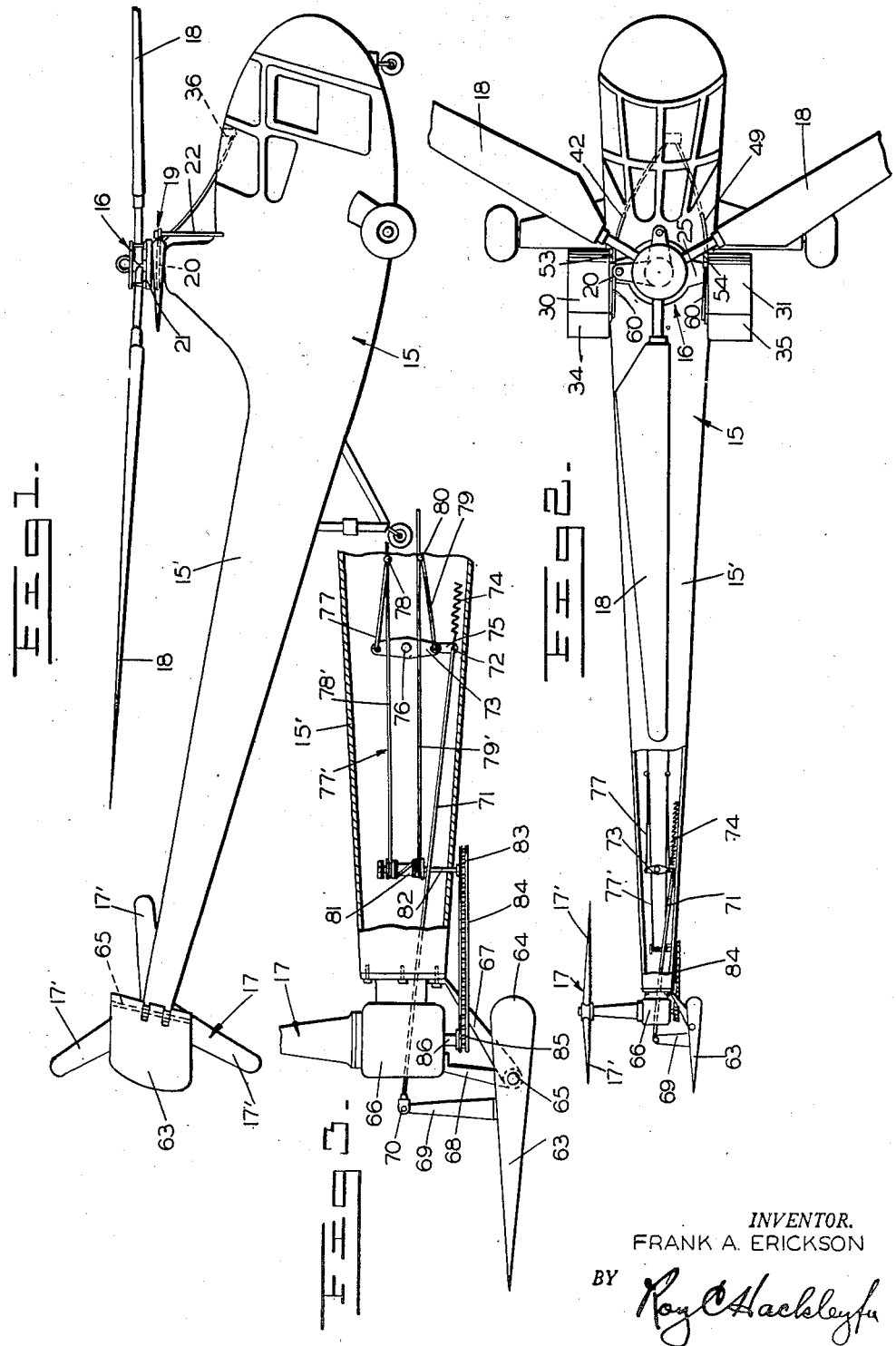
INVENTOR.
FRANK A. ERICKSON
BY
ATTORNEY Dec. 18, 1951  F. A. ERICKSON  2,578,680
STABILIZER FOR ROTARY WING AIRCRAFT
Filed Dec. 5, 1947  4 Sheets-Sheet 2
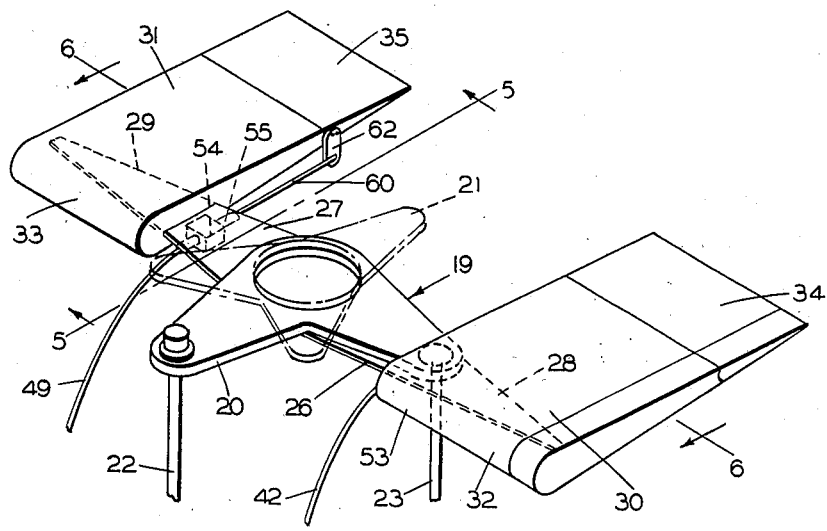
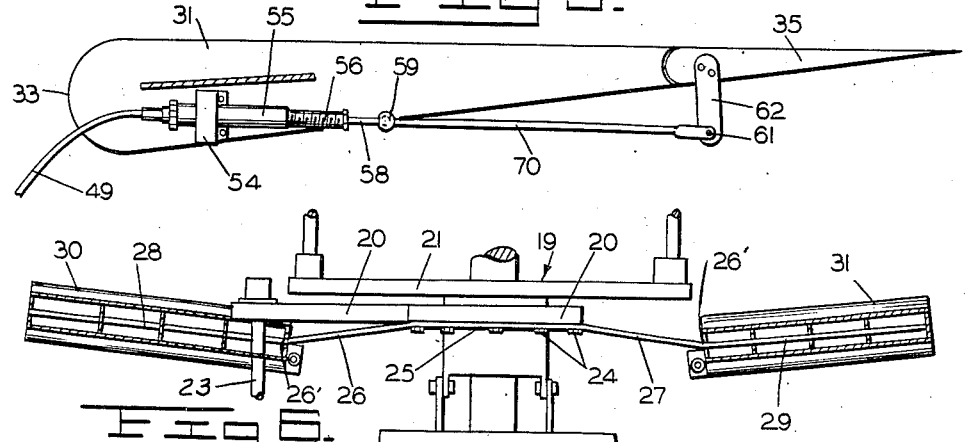
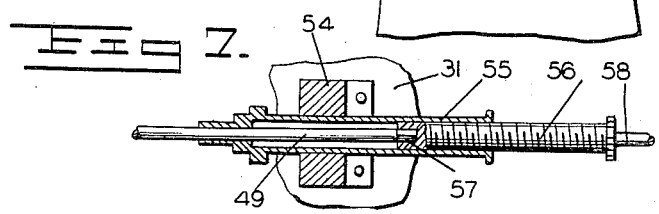
*INVENTOR.*
FRANK A. ERICKSON
BY
ATTORNEY Dec. 18, 1951　　　F. A. ERICKSON　　　2,578,680
STABILIZER FOR ROTARY WING AIRCRAFT
Filed Dec. 5, 1947　　　　　　　　　　　4 Sheets-Sheet 3
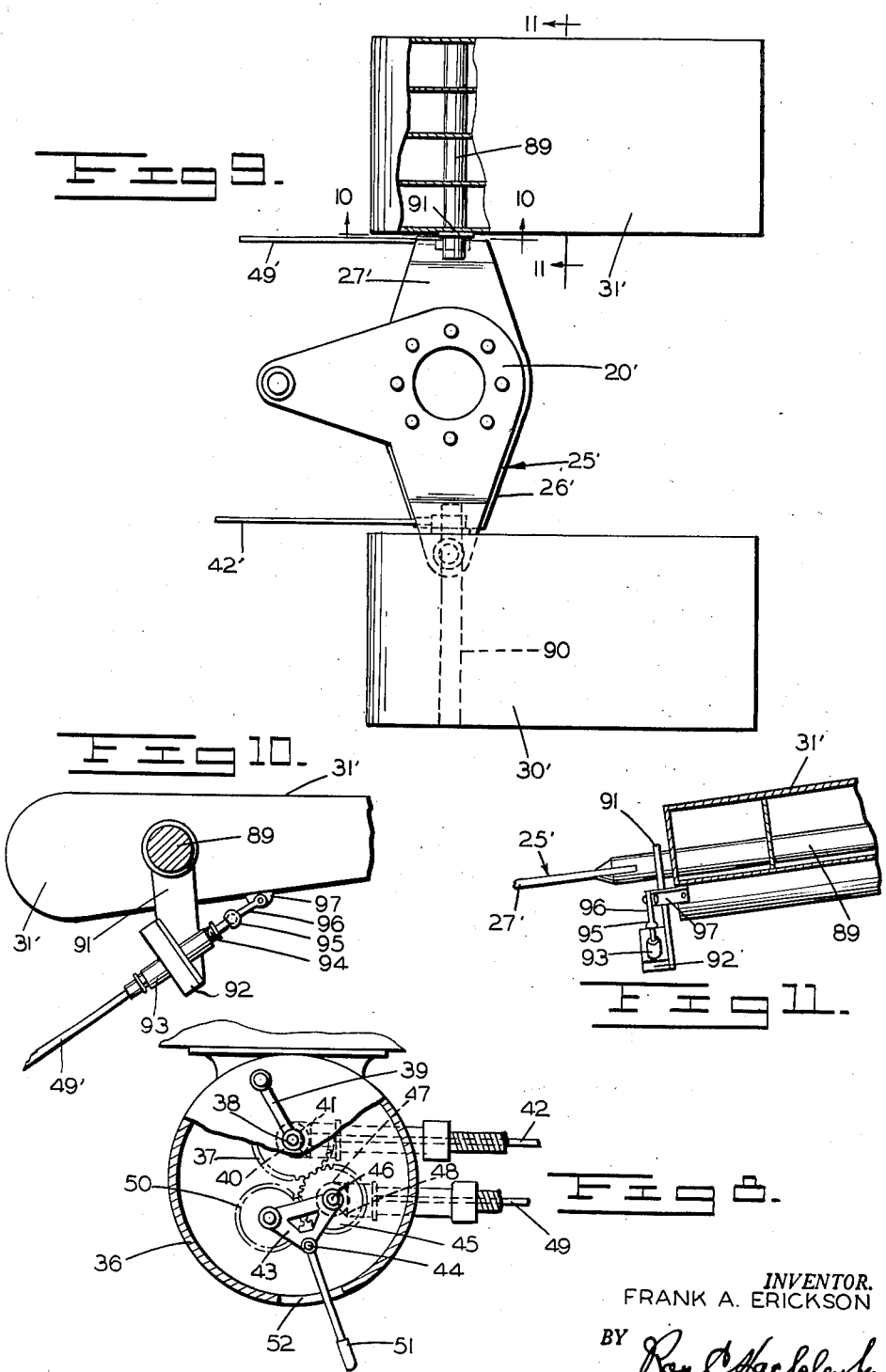
INVENTOR.
FRANK A. ERICKSON
BY
ATTORNEY

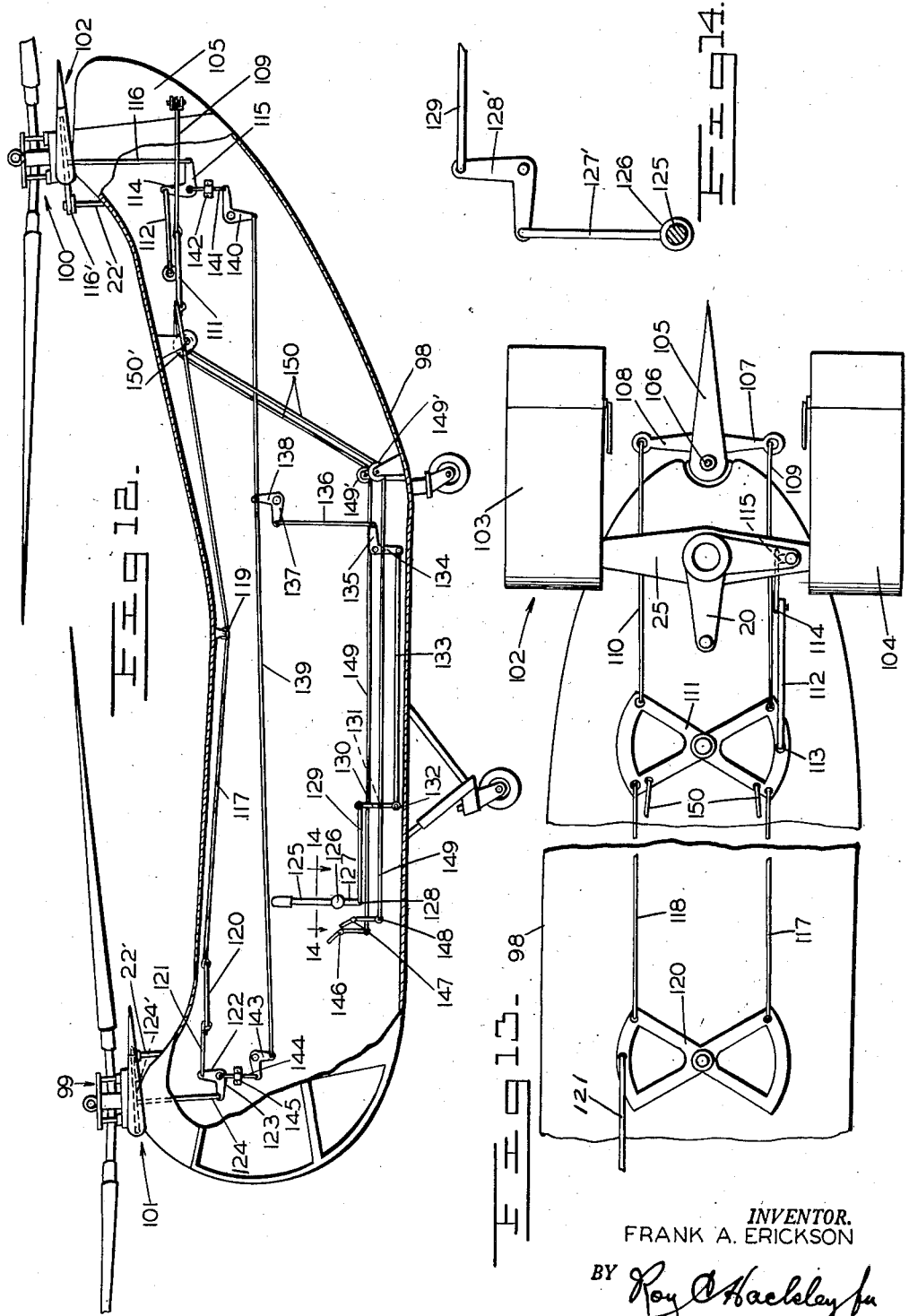

Patented Dec. 18, 1951

2,578,680

UNITED STATES PATENT OFFICE 2,578,680

STABILIZER FOR ROTARY WING AIRCRAFT

Frank A. Erickson, Elizabeth City, N. C.

Application December 5, 1947, Serial No. 790,005

13 Claims. (Cl. 244—17.19)

(Granted under the act of March 3, 1883, as amended April 30, 1928; 370 O. G. 757)

The invention described herein, if patented, may be manufactured and used by or for the Government for governmental purposes without the payment to me of any royalty thereon in accordance with the provisions of the act of April 30, 1928 (Ch. 460, 45 Stat. L. 467).

My invention relates to rotary wing aircraft, and more particularly to stabilizers for such aircraft.

The rotary wing aircraft or helicopter is inherently unstable in cruising flight. Attempts have been made to eliminate this inherent instability, mainly by the employment of vertical or horizontal stabilizers, or both, such stabilizers being mounted upon the fuselage of the aircraft, to directly control the attitude of the same. A disadvantage of this type of stabilizer lies in the fact that it must have a relatively large surface area in order to have an appreciable effect upon the attitude of the fuselage. Accordingly, the present invention is concerned with stabilizers which are relatively small in area and which will produce longitudinal, lateral and directional stability in helicopters through their effect on the cyclic pitch controls of the sustaining rotor, and rudder controls of the torque compensating rotor of the aircraft. The stabilizers embodying the invention are applicable to those helicopters in which longitudinal and lateral control is obtained by varying the pitch of the sustaining rotor blades during their cycle of rotation, and directional control by varying either the pitch of the torque compensating rotor, on single sustaining rotor types, or by differential control of the sustaining rotors in twin sustaining rotor types.

A primary object of this invention is to provide means for stabilizing rotary wing aircraft to maintain a given condition of flight through cruising speed range.

A further object of the invention is to provide a universal stabilizing system for helicopters which will produce sufficient stability in all reference planes so that the aircraft will maintain cruising flight conditions for several minutes, without using the cyclic pitch or rudder controls.

A further object is to provide a stabilizer unit to be attached to the swash plate of the cyclic pitch controls, and tending to reduce control sensitivity under cruising flight conditions to a degree comparable to that of fixed wing aircraft.

A further object is to provide stabilizers of the above mentioned type which provide sufficient stability to permit the use of a standard aeroplane type automatic pilot.

A further object is to preload the cyclic pitch control system by the action of a stabilizer unit mounted upon the swash plate, thereby dampening cyclic pitch stick vibrations.

A further object is to provide a longitudinal and lateral stabilizing unit for helicopters which eliminates the need for bungee or spring trimming devices in the cyclic pitch control system.

A further object is to provide a directional stabilizer which may be used together with or independently of the longitudinal and lateral stabilizer unit of the swash plate, to obtain directional stability in either single sustaining rotor types with a torque compensating rotor, or in twin and multi-rotor types employing differential action between the sustaining rotors to obtain directional control.

A further object is to provide a directional stabilizer for use on the single sustaining rotor type helicopter, having a torque compensating rotor, which can be set to automatically increase torque compensating rotor pitch, to compensate for torque in hovering flight, and also to automatically reduce torque compensating rotor pitch to that required for cruising flight.

A still further object of the invention is to provide a stabilizing system for rotary wing aircraft which will not interfere with precise hovering or slow speed maneuvers of the aircraft.

Other objects and advantages of the invention will become apparent during the course of the following description:

In the accompanying drawings, forming a part of this application, and in which like numerals are employed to designate like parts throughout the same, Figure 1 is a side elevation of a conventional single sustaining rotor helicopter, equipped with the stabilizers embodying the invention;

Figure 2 is a plan view of the same, part broken away, and part in section,

Figure 3 is an enlarged fragmentary plan view of the rear portion of the fuselage, part in horizontal section, Figure 4 is an enlarged fragmentary perspective view of a swash plate, and longitudinal and lateral stabilizers mounted thereon, Figure 5 is a vertical longitudinal section taken on line 5—5 of Figure 4, Figure 6 is a vertical transverse section taken on line 6—6 of Figure 4, Figure 7 is an enlarged fragmentary sectional view showing a screw drive for trim-tabs, Figure 8 is an enlarged fragmentary side elevation of a gear box and crank for controlling the movement of trim-tabs, part in section, Figure 9 is a plan view of a modified form of longitudinal and lateral stabilizing unit, Figure 10 is a vertical longitudinal section taken on line 10—10 of Figure 9, Figure 11 is a vertical transverse section taken on line 11—11 of Figure 9, Figure 12 is a side elevation of a modification of the invention showing stabilizers applied to a twin sustaining rotor helicopter, the fuselage being shown in vertical longitudinal section, Figure 13 is an enlarged fragmentary plan view, partly diagrammatic, illustrating the controls connecting the twin sustaining rotors, parts omitted, and, Figure 14 is a fragmentary plan view of elements of the pilot's lateral controls.

My helicopter has a rotor provided with hinged blades, which rotor describes a cone whose extended axis of rotation passes through the center of gravity of the supported aircraft structure. The directional movement of the helicopter is obtained by tilting the axis of rotation of the cone in the direction in which the movement is desired. The tilting of the cone is accomplished by cyclical variation in the rotor blade pitch. The cyclical pitch changing mechanism includes an upper rotating swash plate section connected with the blades to progressively change their pitch during each cycle of rotation, and a lower swash plate which has a universal mounting and is angularly adjustable in any direction. This is conventional construction and is broadly shown in Patent 2,415,148. The present invention embodies a helicopter having a universally tiltable sustaining rotor with an upper rotatable swash plate section connected with the blades of the sustaining rotor to progressively vary their pitch during each cycle of rotation, and a lower universally tiltable non-rotatable swash plate section which is angularly adjustable to tilt the upper swash plate section.

In the drawings, where for the purpose of illustration are shown preferred embodiments of the invention, attention is called first to Figures 1 to 8 inclusive, wherein the numeral 15 designates a conventional single sustaining rotor type of helicopter, having a fuselage 15', and including a sustaining or lifting rotor 16 and a torque compensating rotor 17 having variable pitch blades 17'. The sustaining rotor 16 includes three variable pitch rotor blades 18 which have their pitch changed during each cycle of rotation, through the action of a conventional cyclic pitch control system. This cyclic pitch control system includes a swash plate assembly 19, having a lower non-rotatable swash plate section 20, and an upper rotatable swash plate section 21. Generally vertical push-pull control rods 22 and 23 are connected to the lower swash plate section 20 in the usual manner and are adapted to be shifted longitudinally for tilting the swash plate section 20 longitudinally or laterally, with respect to the fuselage 15'.

Disposed beneath the lower swash plate section 20, and rigidly secured thereto by means of a circular group of bolts 24, or the like, is a rigid stabilizer mounting plate 25, including outwardly laterally projecting portions or arms 26 and 27. The arms 26 and 27 are bent downwardly slightly, adjacent to the inner portion of the plate 25 beneath swash plate section 20, and upwardly at outer points 26' to form outer lateral inclined portions 28 and 29. A permanent or built-in dihedral angle is thus formed in the stabilizer mounting plate 25. The outer portions 28 and 29 of mounting plate 25 are elongated and tapered toward their outermost ends, and these outer portions 28 and 29 have rigidly mounted thereon generally horizontal rectangular airfoils or stabilizer vanes 30 and 31. The outer portions 28 and 29 extend into and pass laterally through the airfoils 30 and 31, as shown, and are suitably rigidly anchored within the same. The portions 28 and 29 of mounting plate 25 are arranged near the frontal edges 32 and 33 of the airfoils, as shown in Figure 4. The left hand airfoil 30 is slightly wider than the right hand airfoil 31, so that it may provide slightly greater lift to compensate for gyroscopic effect which is transmitted from the sustaining rotor 16. The airfoils or stabilizers 30 and 31 carry adjustable trim-tabs 34 and 35, pivotally connected to the rear ends of airfoils 30 and 31, and adapted to swing vertically with respect to the same.

Means are provided for manually adjusting the trim-tabs 34 and 35 from the cockpit. Such means include a gear box or housing 36, mounted in a convenient location for the use of the pilot, preferably in the upper part of the cockpit, as shown in Figure 1. Arranged within the housing 36 is a gear 37, mounted upon a transverse shaft 38, journaled in the sides of housing 36. A manually operated crank 39 is secured to one end of shaft 38, and is disposed on one outer side of the housing. A bevel gear 40 is mounted upon shaft 38, and is in meshed engagement with a bevel gear 41, secured to the adjacent end of a flexible drive shaft 42. The bevel gears 40 and 41 are disposed outside of housing 36. A triangular frame or yoke 43 is arranged within housing 36, and pivotally connected to the sides of the housing through a pin 44, or the like. Rotatably mounted upon the frame 43 at one inner corner of the same is a gear 45, connected with a shaft 46 which rotates with gear 45. A bevel gear 47 is mounted upon shaft 46 to rotate therewith. The bevel gear 47 meshes with a bevel gear 48 secured to the adjacent end of a flexible drive shaft 49. The bevel gears 47 and 48 are disposed outside of housing 36. Rotatably mounted upon the opposite inner corner of frame 43 is an idler gear 50, which is in permanent meshing engagement with the gear 45, as shown. A gear shifting handle 51 is provided, and rigidly connected to the frame 43. This handle serves as means for swinging the frame 43 about pin 44 for shifting gears 45 and 50 into and out of engagement with gear 37. The handle 51 operates in a slot 52 in housing 36, as shown.

The flexible shafts 42 and 49 extend rearwardly and upwardly toward the airfoils 30 and 31, Figure 1, and are arranged near the inboard edges of the airfoils. Suitable brackets 53 and 54 are rigidly secured to the inboard edges of airfoils 30 and 31, near their frontal edges 32 and 33, as shown. Rigidly held in place by each of the brackets 53 and 54 is a longitudinally extending internally screw threaded sleeve 55, in which is rotatably mounted an externally screw threaded rod 56. The rod 56 is turnable, and will travel longitudinally within sleeve 55 in either direction. The rod 56 has a forward socket 57 into which the adjacent end of one flexible shaft is secured for rotation with the rod 56. Each rod 56 has a rearwardly longitudinally extending portion 58 connected through a ball and socket joint 59 with a longitudinally extending connecting rod 60, in turn pivotally connected at 61 to a depending arm or tab 62 rigidly secured to the inboard edge of the pivoted trim-tab adjacent thereto.

It is thus seen, that the airfoils 30 and 31 together constitute a single compact stabilizing unit for the lower swash plate section 20. The airfoils 30 and 31 have a relatively small total surface area, because they need only be capable of producing a change in the attitude of the swash plate section 20, and not in the entire fuselage of the helicopter. In some installations, the total combined areas of both airfoils 30 and 31 are approximately only 5¾ square feet.

Arranged at the rear end of the fuselage 15' and laterally opposite to the torque compensating rotor 17 is a vertical directional stabilizer vane or airfoil 63. This airfoil 63 has a frontal edge 64, and the airfoil is pivotally mounted upon a generally vertical shaft 65 and adapted to swing horizontally upon the same. The shaft 65, carrying the airfoil 63 is rigidly connected to the rear end of the fuselage, and to the torque compensating rotor gear box or housing 66, by means of suitable rigid brackets 67 and 68 respectively. Rigidly secured to the inboard side of airfoil 63, and arranged generally at right angles to the same and extending laterally thereof is an arm 69, pivotally connected at 70 with a push-pull rod 71. This rod 71 extends into the fuselage and projects forwardly longitudinally in the same and is pivotally connected at 72 with a transverse crank-lever 73. A retractile coil spring 74 is connected at its forward end to the fuselage structure, and at its rear end 75 it is connected to the end of crank-lever 73 adjacent to rod 71. The transverse crank-lever 73 has a fixed pivot 76, near its longitudinal center, and is adapted to be swung horizontally about such pivot. At its end remote from rod 71, crank-lever 73 is connected to a cable 77, which is tied into one run 78' of the manually operated pitch control cable 77' for the torque compensating rotor 17. Cable 77 is tied into the run 78' at 78, as shown. Laterally inwardly of spring 74, crank-lever 73 is connected to a cable 79, which is tied into the opposite run 79' of cable 77', as at 80. The cable 77' is wound upon a spool 81, mounted upon a rotatable transverse horizontal shaft 82. The cable 77' is so wound upon spool 81 that when one of its runs is wound up on the spool, the other run is let out therefrom. The runs 78' and 79' of cable 77' extend forwardly in the fuselage of the helicopter and are connected in a conventional manner to conventional manually operated foot pedals in the cockpit, which are actuated to vary the pitch of the blades 17' of torque compensating rotor 17. The rotatable shaft 82 carries a sprocket wheel 83 at its outer end, and a sprocket chain 84 engages about the sprocket wheel 83, and is also operatively connected with a sprocket wheel 85 mounted upon a rotatable shaft extension 86, which changes the pitch of blades 17, when rotated.

In operation, the horizontal airfoils or stabilizers 30 and 31 provide both lateral and longitudinal stability through their reaction upon the lower swash plate section 20 during forward flight. The airfoils 30 and 31 place a load in the cyclic pitch control system which has the effect of dampening out stick vibrations during cruising flight. The trim-tabs 34 and 35 are actuated from the cockpit by means of the crank 39 and gearing shift handle 51. Longitudinal trim is obtained by moving the trim-tabs together, and lateral trim by moving them differentially. This is accomplished by turning crank 39, and swinging gear shifting handle 51. In order to swing trim-tabs 34 and 35 together, and in the same direction, handle 51 should be swung to the left, Figure 8, so that idler gear 50 meshes with gear 37. To move the trim-tabs together in opposite directions, the handle 51 should be swung to its right position shown in Figure 8. The trim-tabs may be moved into any relative position found to be necessary. The airfoils 30 and 31 have practically no effect during hovering flight, and do not interfere with controllability of the helicopter at that time. All forces causing unbalance in the cyclic pitch controls tend to be balanced out by the airfoils 30 and 31. The built-in dihedral angle of these airfoils produces added lateral stability. It is believed that the addition of the airfoils 30 and 31 is enough to provide sufficient stability and dampening effect to permit the use of a standard aeroplane-type automatic pilot.

Directional stability and torque compensation are obtained by means of the vertical airfoil 63, which is acted upon by spring 74, tending to apply full torque in hovering flight. The airfoil 63 could be arranged anywhere on the fuselage where the airflow is not disturbed, but the preferred location is shown and described. Spring 74 places a constant load on the air foil 63, tending to apply full left rudder control by increasing the pitch of the torque compensating rotor blades 17'. The inflow of air past airfoil 63 to the torque compensating rotor 17 aids the spring 74 in holding left rudder control in hovering flight. In forward flight, airfoil 63 tends to align itself with the relative wind and opposes the action of the spring 74. The effectiveness of this action of airfoil 63 increases with increase in speed. At intermediate speeds spring 74 will apply a small degree of left rudder control to compensate for the reduced torque reaction. At high speeds it will practically feather the torque compensating rotor, as little or no torque compensation is required at high speeds. When flying speed is reduced, spring 74 partially overcomes the effect of the airfoil, as the airfoil's effectiveness is reduced with the reduced flow of air over it. In hovering flight, the airfoil will cut out completely, allowing the spring to apply full left rudder control.

The helicopter fuselage is affected by side wind gusts in the same manner as a wind sock, that is, it will swing with the nose of the aircraft into the gust. The inertia of airfoil 63 being much less than that of the fuselage permits the airfoil to be deflected by the gust before the fuselage is deflected. Assuming that a wind gust strikes the right side of the aircraft in cruising flight, airfoil 63 will be deflected to the left, looking forward in Figure 3, rod 71 will be shifted longitudinally forwardly turning crank-lever 73 counterclockwise. Crank-lever 73 in turn will move the directional controls through cables 77 and 77', increasing the pitch of torque compensating rotor blades 17', which opposes the side wind gust, tending to prevent the aircraft from turning into the gust. Crank-lever 73 moves cables 77 and 77', which causes drum 81 and shaft 82 to rotate, driving sprocket chain 84, and shaft extension 86, to change the pitch of torque compensating rotor blades 17'. The separate runs 78' and 79' of cable 77' may always be manually operated by the foot pedals in the cockpit. In addition airfoil 63 automatically moves the runs 78' and 79' through the medium of crank-lever 73, and associated elements.

Attention is called next to Figures 9 to 11 inclusive, wherein I have shown a modified form of lateral and longitudinal stabilizing unit, similar to the lateral and longitudinal stabilizing unit in the first form of the invention, which includes airfoils 30 and 31. In this form of the invention, I contemplate omitting trim-tabs 34 and 35. In Figures 9 to 11 inclusive, generally horizontal rectangular stabilizers or airfoils 30' and 31' are provided, and these stabilizers are carried by a rigid mounting plate 25' similar to the mounting plate 25. The mounting plate 25' is bolted to the bottom of a lower swash plate section 20' in the same manner as the plate 25 is bolted to the swash plate section 20. In this form of the invention, the trim-tabs are omitted, as stated, and the airfoils 30' and 31' are adapted to swing bodily vertically, through a limited travel. The mounting plate 25' projects laterally upon both ends of swash plate section 20' and terminates adjacent to the inboard edges of stabilizers 30' and 31', as shown. Cylindrical bars or shafts 89 and 90 are provided and are permanently rigidly connected at their inboard ends to the outer ends of mounting plate 25'. The shafts 89 and 90 are non-rotatable with respect to mounting plate 25', and project into and through the stabilizers 30' and 31', which are rotatably mounted upon the shafts 89 and 90, and adapted to be swung vertically bodily thereon.

Flexible shafts 42' and 49' are provided and are connected with the gear box 36 in the same manner shown and described in connection with the first form of the invention. Each of the airfoils 30' and 31' has a depending bracket 91 rigidly mounted upon its associated relatively stationary shaft 89 or 90, and including an inclined right angle extension 92, which projects beneath the lower side of the airfoil and inwardly. Rigidly secured to each extension 92 is an internally screw threaded sleeve 93, receiving an externally screw threaded rod 94, similar to the rod 56. Each rod 94 is connected through a ball and socket joint 95 with a connecting rod 96, in turn pivotally connected with a depending lug 97, rigidly attached to the associated stabilizer 30' or 31'.

In the form of the invention shown in Figures 9 to 11, when the crank 39 of gear box 36 is turned, the flexible drive shafts 42' and 49' are turned, causing the screw threaded rods 94 to move longitudinally within the screw threaded sleeves 93, causing the stabilizers 30' and 31' to swing vertically bodily about the shafts 89 and 90. Through the use of gear shift handle 51, as described in the first form of the invention, the stabilizers 30' and 31' may be moved together or differentially. All other parts are identical with those shown and described in connection with the first form of the invention.

Attention is called next to Figures 12 and 13, wherein a modified form of the invention is illustrated, and the stabilizers are shown applied to a twin sustaining rotor type helicopter. In Figures 12 and 13, the numeral 98 designates the fuselage of a twin sustaining rotor helicopter, having forward and aft sustaining rotors 99 and 100, each of which is identical in construction and operation to the rotor 16 shown and described in connection with the first form of the invention. The rotors 99 and 100 are shown equipped with horizontal stabilizer units 101 and 102, and each of the units 101 and 102 includes airfoils 103 and 104 which are identical in construction and operation with the airfoils 30 and 31. These airfoils 103 and 104 are equipped with trim-tabs and operating means therefor, identical to those shown and described in connection with the first form of the invention. The stabilizer units 101 and 102 act upon the rotors 99 and 100, to afford longitudinal and lateral stability for such rotors in the same manner as the single rotor is stabilized.

A vertical directional stabilizer 105 is disposed adjacent to the rear end of fuselage 98, and is mounted upon a vertical rock shaft 106, and adapted to swing horizontally thereon. The vertical stabilizer 105 includes laterally projecting arms 107 and 108 rigidly connected therewith, and the outer ends of these arms are pivotally connected to cables 109 and 110. The cables 109 and 110 are in turn pivotally connected with the aft corners of a horizontally swingable sector 111. A rod 112 is pivotally connected at one end to one side of sector 111, as shown at 113, and this rod projects rearwardly from the sector, and is pivotally connected to the vertical arm 114 of a bell crank, whose generally horizontal arm 115 is pivotally connected to a vertical push-pull rod 116 (corresponding to rod 23, Figure 4), in turn connected at its upper end to one side of the lower swash plate section 116' of rotor 100. The forward corners of sector 111 are connected to cables 117 and 118, which are parallel and extend longitudinally within the upper part of the fuselage and engage beneath pulleys 119, as shown. The forward ends of cables 117 and 118 are connected to the aft corners of a horizontally swingable sector 120, having a push-pull rod 121 pivotally connected to its side remote from the rod 112, and projecting forwardly from the sector, and pivotally connected to the vertical arm 122 of a bell crank having a generally horizontal arm 123. The arm 123 is in turn pivotally connected with a generally vertical push-pull rod 124 (corresponding to rod 23, Figure 4), connected at its upper ends to one side of the swash plate 124' of rotor 99. The push-pull rods 124 and 116 are connected to opposite sides of the swash plates of rotors 99 and 100. The swash plate sections 116' and 124' are swung longitudinally of the fuselage by rods 22', corresponding to rod 22, Figure 1, and rods 22' and 22 are moved in the conventional manner.

Manually operated cyclic pitch controls are provided, and these controls are adapted to change the attitude of rotors 99 and 100 in unison to obtain lateral and longitudinal control for the helicopter. Inasmuch as both lateral and directional controls are obtained by tilting the swash plates laterally (in unison for lateral control and differentially for directional control), the complete lateral and directional control systems are shown schematically. The lateral control consists of a stick 125, universally pivoted at 126, and having a depending extension 127, pivotally connected to a transverse connecting rod 127', in turn pivotally connected to a pivoted bell crank 128' which swings horizontally. The bell crank 128' is pivotally connected with a longitudinally shiftable rod 129. The rod 129 is pivotally connected to the top end of a walking beam 130, which is pivoted near its center, as at 131, and pivotally connected at its lower end 132 to a longitudinally shiftable rod 133. The rod 133 extends longitudinally rearwardly and is disposed near the bottom of the fuselage, and is pivotally connected at its rear end to the vertical arm 134 of a bell crank, whose generally horizontal arm 135 is pivotally connected to a vertical push-pull rod 136, in turn pivotally connected at its upper end to the horizontal arm 137 of a bell crank including a generally vertical arm 138, connected to a longitudinally shiftable long push-pull rod 139. The rod 139 serves to connect the rotors 99 and 100 with the manual controls including stick 125, so that they may be tilted in unison. The rear end of rod 139 is pivotally connected with a pivoted bell crank 140 in turn pivotally connected with a vertical reciprocatory rod 141, adapted to slide vertically in a suitable fixed guide 142. The top end of rod 141 is pivotally connected to the fulcrum of the bell crank including arm 114, and is adapted to shift such bell crank bodily vertically. The forward end of rod 139 is pivotally connected with a pivoted bell crank 143, in turn pivotally connected to a vertical reciprocatory rod 144 adapted to be shifted vertically within a fixed guide 145, and pivotally connected at its top end to the fulcrum of the bell crank including arm 122. The rod 144 is adapted to shift the bell crank including arm 122 bodily vertically.

Rudder controls are provided, including foot pedals 146, which are pivoted at 147, and connected at their lower ends 148 to longitudinally shiftable cables 149. The cables 149 extend rearwardly, and pass about fixed pulleys 149'. These cables extend upwardly, forming generally vertical runs 150, which pass about fixed pulleys 150'. The runs 150 are attached to the forward corners of sector 111, as shown.

The operation of the form of the invention shown in Figures 12 and 13 is as follows:

Assuming that a side gust of wind were to strike the rear of fuselage 98, tending to deflect it to the left, the vertical stabilizer 105 would be almost immediately deflected to the left, moving cables 109 and 110, which in turn swing the quadrant 111. The motion imparted to the quadrant 111 is transmitted through push-pull rod 112, bell crank including arms 114 and 115, and push-pull rod 116 which tilts the swash plate section 116' of rotor 100 laterally to the right. Likewise, simultaneously, the swash plate section 124' of forward rotor 99 is tilted laterally to the left, through the action of cables 117 and 118, which transmit the motion in quadrant 111 to quadrant 120, which in turn moves push-pull rod 121, bell crank 122 and push-pull control rod 124. Thus when the wind gust displaces the stabilizer 105, such stabilizer affects an immediate change in the attitude of both sustaining rotors 99 and 100, utilizing their differential cyclic pitch control system. Since the fuselage 98 has far greater inertia than stabilizer 105, the stabilizer will move, and produce the stabilizing correction of the rotors 99 and 100, before the fuselage can be moved appreciably by the wind gust.

The manual cyclic pitch controls including stick 125 are also connected in the system at all times. The stick 125 is swung laterally about its universal pivot 126 to shift rod 129 longitudinally, swinging walking beam 130 about its pivot, shifting rod 133 longitudinally, turning the bell crank including arms 134 and 135, shifting rod 139 longitudinally. The rod 139 causes bell cranks 140 and 143 to turn simultaneously. The bell crank 140 shifts rod 141 vertically in fixed guide 142, causing bell crank including arm 114 to be shifted vertically bodily, shifting rod 116 vertically and tilting the swash plate section 116' of rotor 100 laterally. The bell crank 143 simultaneously shifts rod 144 vertically in the opposite direction to the movement of rod 141, causing bell crank including arm 122 to shift vertically bodily with it, shifting control rod 124 vertically and tilting the swash plate section 124' of rotor 99 laterally in the same direction as swash plate section 116' of rotor 100. The directional controls including foot pedals 146 are operatively connected with the stabilizer 105. Foot pedals 146 may be pivoted at 147, for shifting cables 149 longitudinally, shifting runs 150, which are attached to the forward corners of sector 111, as stated. The sector 111 may thus be turned by manipulating the pedals 146, and the stabilizer 105 is thus manually movable.

The longitudinal and lateral stabilizer units 101 and 102 function to stabilize the swash plates of rotors 99 and 100 in the same manner as the stabilizers 30 and 31 stabilize swash plate 19.

The basic idea embodying the stabilizer 105 is applicable also to co-axial sustaining rotor helicopters, in which the total pitch is changed differentially to obtain directional control.

It is to be understood that the forms of the invention herewith shown and described are to be taken as preferred examples of the same, and that various changes in the shape, size and arrangement of parts may be resorted to, without departing from the spirit of the invention or the scope of the sub-joined claims.

Having thus described my invention, I claim:

1. In a helicopter, in combination, cyclic pitch controls including a non-rotatable swash plate section, a mounting plate secured to said non-rotatable swash plate section, shafts fixedly secured to the mounting plate, stabilizer vanes pivotally mounted upon the shafts to vary their angle of attack, and means to change the angle of attack of said stabilizer vanes.

2. In a helicopter, a fuselage, sustaining rotors mounted upon the fuselage, cyclic pitch control means for each sustaining rotor and including a non-rotatable swash plate section, and stabilizer vanes mounted upon each of said non-rotating swash plate sections.

3. In a helicopter, the combination with cyclic pitch controls including a non-rotatable swash plate section, of stabilizer vanes mounted upon the non-rotatable swash plate section and arranged at a dihedral angle.

4. In a helicopter, a fuselage, sustaining rotors mounted upon the fuselage, cyclic pitch control means for each sustaining rotor and including a non-rotatable swash plate section, stabilizer vanes mounted upon each of said non-rotatable swash plate sections, and operating connecting means between the swash plate sections to cause them to tilt laterally in the same and opposite directions.

4. In a helicopter, a fuselage, sustaining rotors mounted upon the fuselage, cyclic pitch control means for each rotor including a non-rotatable swash plate section, stabilizer vanes mounted upon each of said non-rotatable swash plate sections, manually operated means connecting the swash plate sections and causing them to tilt in opposite directions, a directional stabilizer vane mounted upon the fuselage, and means operated by the directional stabilizer vane and connected with the manually operated means to move said manually operated means.

6. A helicopter, comprising a fuselage, a sustaining rotor mounted upon the fuselage, cyclic pitch controls for the sustaining rotor and including a non-rotatable swash plate section, stabilizer vanes mounted upon opposite sides of said swash plate section, and means to connect the stabilizer vanes with the swash plate section for control thereof.

7. A helicopter, comprising a fuselage, a sustaining rotor mounted upon the fuselage, cyclic pitch controls for the sustaining rotor and including a non-rotatable swash plate section, stabilizer vanes arranged upon opposite sides of said swash plate section, means to connect the stabilizer vanes with said swash plate section, a directional stabilizing vane mounted upon the fuselage, manually operated means connected with said swash plate section to tilt the same, and connecting means between the stabilizer vane and manually operated means for actuation thereof.

8. A helicopter, comprising a fuselage, a sustaining rotor mounted upon the fuselage, cyclic pitch controls for the sustaining rotor and including a lower non-rotatable swash plate section mounted for universal movement and non-rotatable stabilizing vanes arranged upon opposite sides of the said swash plate section and connected with said swash plate section for controlling its action.

9. In rotary wing aircraft, in combination, rotating sustaining means, a fuselage, control means connected with said rotating sustaining means to vary the thrust and direction of thrust of said rotating sustaining means, non-rotating airfoil means mounted for movement about an axis offset from the center of pressure of said airfoil in response to aerodynamic forces, said airfoil means being operatively connected to said control means for actuation thereof in response to aerodynamic forces acting on said airfoil means.

10. In combination, a helicopter provided with rotor blade pitch controls including a non-rotating swash plate section, stabilizing means including non-rotating airfoils mounted for movement about an axis offset from the center of pressure of said airfoil in response to aerodynamic forces, and means to connect the stabilizing means with said non-rotating swash plate section for actuation thereof.

11. In combination, an aircraft having rotative sustaining means, control means connected to said sustaining means, non-rotating laterally disposed airfoils mounted on said aircraft said mounting including means to permit said airfoils to rock about an axis parallel to the longitudinal axis of said aircraft and to rock about an axis parallel to the pitching axis of said aircraft, means connecting said airfoils to said control means, the center of pressure of said airfoils being offset from the aforementioned axes about which said airfoils rock.

12. In combination, a helicopter provided with a sustaining rotor and cyclic pitch controls therefor and including a swash plate having a non-rotating portion universally mounted, stabilizing vanes laterally disposed from said swash plate, the spanwise axes of said vanes intersecting at a point below said swash plate, said axes being angularly related to provide a positive dihedral angle between the planes of said vanes, means connecting said vanes with the non-rotating portion of the swash plate for operation of said swash plate in response to aerodynamic forces acting on the stabilizer vanes.

13. The combination as set forth in claim 12 and including trim tabs mounted on the stabilizer vanes and means for adjusting the angular relationship of the trim tabs with respect to the chord lines of said vanes.

FRANK A. ERICKSON.

REFERENCES CITED

The following references are of record in the file of this patent:

UNITED STATES PATENTS

| Number | Name | Date |
| --- | --- | --- |
| 1,800,470 | Oemichen | Apr. 14, 1931 |
| 2,318,259 | Sikoorsky | May 4, 1943 |
| 2,368,698 | Young | Feb. 6, 1945 |
| 2,402,294 | Pitcairn | Jan. 18, 1946 |
| 2,443,192 | Moeller | June 15, 1948 |

FOREIGN PATENTS

| Number | Country | Date |
| --- | --- | --- |
| 155,974 | Switzerland | Oct. 1, 1932 |
| 844,048 | France | Apr. 11, 1939 |